(12) United States Patent  
Björkman et al.

(10) Patent No.: US 12,436,532 B2  
(45) Date of Patent: Oct. 7, 2025

(54) CONTROL METHOD AND CONTROL UNIT FOR A MARINE VESSEL

(71) Applicant: CPAC SYSTEMS AB, Gothenburg (SE)

(72) Inventors: Simon Björkman, Gothenburg (SE); David Wall, Gothenburg (SE); Lennart Dahlström, Mölnlycke (SE); Oskar Waldemarsson, Gothenburg (SE)

(73) Assignee: CPAC SYSTEMS AB, Gothenburg (SE)

( * ) Notice: Subject to any disclaimer, the term of this patent is extended or adjusted under 35 U.S.C. 154(b) by 233 days.

(21) Appl. No.: 17/999,282

(22) PCT Filed: May 20, 2020

(86) PCT No.: PCT/EP2020/064034  
§ 371 (c)(1),  
(2) Date: Nov. 18, 2022

(87) PCT Pub. No.: WO2021/233533  
PCT Pub. Date: Nov. 25, 2021

(65) Prior Publication Data  
US 2023/0205207 A1 Jun. 29, 2023

(51) Int. Cl.  
*G05D 1/02* (2020.01)  
*B63B 79/10* (2020.01)  
(Continued)

(52) U.S. Cl.  
CPC ........... *G05D 1/0206* (2013.01); *B63B 79/10* (2020.01); *B63H 21/213* (2013.01); *B63B 2213/02* (2013.01); *B63H 2021/216* (2013.01)

(58) Field of Classification Search  
CPC .. G05D 1/0206; B63B 79/10; B63B 2213/02; B63H 21/213; B63H 2021/216  
(Continued)

(56) References Cited

U.S. PATENT DOCUMENTS 6,273,771 B1 * 8/2001 Buckley .................. G08G 3/02  
114/144 RE  
6,299,496 B1 * 10/2001 Griffiths ................. B63H 21/32  
440/89 R  
(Continued)

FOREIGN PATENT DOCUMENTS

CA 2654305 A1 * 12/2007 ............. B63B 79/00  
CA 2976204 A1 * 2/2018 ............. B63B 79/10  
(Continued)

OTHER PUBLICATIONS

Chinese Office Action dated Jul. 27, 2023 in corresponding Chinese Patent Application No. 202080100890.7, 6 pages.  
(Continued)

*Primary Examiner* — Tuan C To  
(74) *Attorney, Agent, or Firm* — Venable LLP; Jeffri A. Kaminski

(57) ABSTRACT

A method to control a marine vessel comprising two or more drive units. The method involves registering an operating command indicating a requested sideways or bow bollard push function; detecting a current vessel position; registering the current vessel position as a desired vessel position; executing the requested bollard push function; and monitoring the current vessel position in order to detect a deviation relative to the desired vessel position. If it is detected that a deviation between the desired vessel position has exceeded a predetermined value, then the requested bollard push function is deactivated. The disclosure further relates to a control unit arranged to control a marine vessel and a marine vessel comprising such a control unit.

13 Claims, 6 Drawing Sheets

(51) Int. Cl.
B63H 21/21 (2006.01)
G05D 1/00 (2006.01)
(58) Field of Classification Search
USPC .......................................................... 701/21
See application file for complete search history.

(56) References Cited

U.S. PATENT DOCUMENTS

| | | | | |
|---|---|---|---|---|
| 6,511,354 | B1 * | 1/2003 | Gonring | ................ B63H 25/02 |
| | | | | 440/87 |
| 9,274,528 | B2 * | 3/2016 | Wilson | ................ G05D 1/0875 |
| 10,167,057 | B1 * | 1/2019 | Terada | ...................... B63B 1/32 |

FOREIGN PATENT DOCUMENTS

| | | |
|---|---|---|
| CA | 3101609 A1 | 12/2019 |
| CN | 102171095 A | 8/2011 |
| CN | 107249980 A | 10/2017 |
| CN | 209854667 U | 12/2019 |
| EP | 1775211 A2 * | 4/2007 ............. B63H 21/22 |
| JP | 2019162977 A | 9/2019 |
| WO | WO-2006062416 A1 * | 6/2006 ............. B63H 25/46 |
| WO | WO-2007142537 A2 * | 12/2007 ............. B63B 79/00 |
| WO | 2010039952 A1 | 4/2010 |
| WO | 2019231464 A1 | 12/2019 |

OTHER PUBLICATIONS

International Search Report and Written Opinion of the International Searching Authority in corresponding International Application No. PCT/EP2020/064034 mailed Mar. 1, 2021 (9 pages).

International Preliminary Report on Patentability in corresponding International Application No. PCT/EP2020/064034 mailed Apr. 14, 2022 (6 pages).

Mingkang Wu; "Numerical analysis of docking operation between service vessels and offshore wind turbines"; Ocean Engineering; vol. 91, Nov. 15, 2014, pp. 379-388; https://doi.org/10.1016/j.oceaneng.2014.09.027 (10 pages).

* cited by examiner

CONTROL METHOD AND CONTROL UNIT FOR A MARINE VESSEL

CROSS-REFERENCE TO RELATED APPLICATIONS

This application is a U.S. National Stage application of PCT/EP2020/064034, filed May 20, 2020 and published on Nov. 25, 2021, as WO 2021/233533, all of which is hereby incorporated by reference in its entirety.

TECHNICAL FIELD

The present disclosure relates to a method for controlling a marine vessel during a docking manoeuvre, where the vessel is held against a solid structure such as a dock. The disclosure further relates to a control unit and a vessel provided with such a control unit.

BACKGROUND

Under some circumstances a vessel may be required to perform a docking manoeuvre where the vessel is not moored, but merely held against the side of a dock using the propulsion system. This manoeuvre can be generally referred to as a "bollard push manoeuvre" as the drive units making up the propulsion system are being operated while the vessel is held in position with its bow or side being forced against the side of a dock.

When performing a bollard push manoeuvre, the vessel is supposed to stay in place with its side or bow being held against the dock by the thrust from the propulsion system. This manoeuvre can be used for allowing passengers to board or disembark without having to tie the vessel up in a mooring position. A problem with this manoeuvre is that the vessel can start moving from its originally intended position due to external factors. Examples of such external factors can be a sudden burst of wind, an unexpected water current or a movement of the dock itself. Under such conditions the vessel can suddenly drift off in an unexpected direction, potentially resulting in a dangerous situation. A further problem is that an operator detecting an unexpected vessel movement may try to correct for the displacement by operating the direction and magnitude of the thrust of the propulsion system, If this operation is not performed swiftly and/or correctly the dangerous situation will not be corrected.

The object of the invention is to provide an improved method for controlling a vessel during a sideways or bow bollard push manoeuvre and a control unit for performing said method in a way that solves the above problems.

SUMMARY

The above problems have been solved by method to control a marine vessel, a control unit and a vessel provided with such a control unit, as claimed in the appended claims.

In the subsequent text, the terms "vessel heading" or "heading" are intended to describe the direction of the longitudinal axis of the vessel in or relative to the normal direction of travel. Conventionally, the normal direction of travel is usually the forward direction, in which case the heading is the direction in which the bow of the vessels is pointing. The term "drive unit" is used to denote both main propulsion units and bow or lateral thrusters. Lateral thrusters are usually provided for assisting displacement of the vessel in a transverse or diagonal direction when only a single main propulsion unit is provided or if the main propulsion units cannot be maneuvered to provide a sufficient transverse thrust. In order to displace the vessel transversely or in a diagonal direction, at an angle to the vessel heading, a minimum of two drive units is required. Hence, the minimum requirement is a vessel having a single propulsion unit and a single bow thruster or a vessel having a minimum of two main propulsion units. The manoeuvre being performed by a vessel performing the claimed method will be referred to as a "bollard push manoeuvre", during which manoeuvre the drive units making up the propulsion system will remain operational. Further, a vessel being held with its bow against the dock will be described as performing a "bow bollard push". Similarly, a vessel being held with its side against the dock will be described as performing a "sideways bollard push". A vessel having this capability will be described as having a bollard push function.

According to one aspect, the disclosure relates to a method to control a marine vessel comprising two or more drive units, which method involves the steps of:
registering an operating command indicating a requested bollard push function;
detecting a current vessel position;
registering the current vessel position as a desired vessel position;
executing the requested bollard push function; and
monitoring the current vessel position in order to detect a deviation relative to the desired vessel position.

If a detected deviation relative to the desired vessel position has exceeded a predetermined value, then the requested bollard push function is automatically deactivated.

In this way it is detected if the vessel unexpectedly drifts away from its intended position during a bollard push manoeuvre. Deactivation of the bollard push function will at least involve an inhibition of the thrust from the drive units. If the unexpected displacement of the vessel is caused by an external factor such as a sudden gust of wind or a displacement of a floating dock, then a drive unit disengagement or shutdown avoids further unexpected vessel movement if the initial cause of the displacement stops.

According to a first example, the method involves monitoring if the deviation of a current vessel position relative to the desired vessel position has exceeded a predetermined distance. In this instance, the vessel is placed alongside a dock when sideways bollard push manoeuvre is being performed, then the drive units will provide a transverse thrust to maintain the side of the vessel in contact with the dock. During the manoeuvre, a displacement in the transverse and/or the longitudinal direction of the vessel is constantly monitored. If the vessel is suddenly displaced away from or along the dock, then the requested bollard push function is deactivated.

According to a second example, the method involves monitoring if the deviation of a current vessel heading relative to the desired vessel heading has exceeded a predetermined angle. In this instance, the vessel is placed with its bow against a dock when a bow bollard push manoeuvre is being performed, then the drive units will provide a thrust substantially in the longitudinal direction to maintain the bow of the vessel in contact with the dock. During the manoeuvre, an angular displacement of the vessel, where the bow is a pivot point, is constantly monitored. If the vessel is suddenly displaced a predetermined angle away from the initial vessel position against the dock, then the requested bollard push function is deactivated. The method according to this example can be combined with that described in the first example above, to cover both angular and linear displacements. For instance, if the vessel is displaced in its longitudinal direction only, then this would not cause a change in the heading. However, the function would still be deactivated if the predetermined distance is exceeded.

According to a third example, the method involves monitoring if the rate of change of the deviation for a current vessel position relative to the desired vessel position has exceeded a predetermined value. For instance, if the vessel is placed with its side or bow against a dock when the bollard push manoeuvre is being performed, then the drive units will provide a suitable thrust to maintain the side or the bow of the vessel in contact with the dock. During the manoeuvre, any angular or linear displacement of the vessel is constantly monitored. If the vessel is displaced linearly or angularly away from the initial vessel position against the dock at a rate that exceeds a predetermined rate of change, then the requested bollard push function is deactivated.

Monitoring of the bollard push function can be performed using any one of the above monitoring methods, alone or in combination. During execution of the manoeuvre the drive units will provide a requested or predetermined thrust having a suitable magnitude and direction to maintain a selected portion of the vessel in contact with the dock or a similar fixed structure. A relatively limited amount of thrust will be sufficient for achieving this, wherein the drive units can be operated a relatively low speed, such as at or near their idling speeds.

An operating command indicating that a bollard push function is requested can be registered in response to an input signal from a joystick, a graphical user interface (GUI) or to input signals from at least one throttle controller and a helm controller, optionally in combination with a switch.

As indicated above, the method involves at least disengaging the drive units when deactivating the requested bollard push function. The method can optionally involve the further steps of registering an updated current vessel position and executing a position hold function in order to maintain the updated current vessel position. The updated current vessel position can be the position of the vessel at the time when the requested bollard push function is deactivated and/or the thrust from the drive units is inhibited. At this time the drive units are not providing any thrust. To achieve this, ICE drive units can be disengaged by switching them into a neutral gear and maintained idling, while electric drive units can be switched off. Once the current vessel position is updated the vessel will execute a position hold function in order to maintain that position. This operation will prevent the vessel from drifting further away from the dock or towards the dock under the influence of external factors, such as wind or water currents. The vessel position is preferably determined by a Global Navigation Satellite System (GNSS) with a suitable accuracy, such as a Differential Global Positioning System (DGPS).

According to a second aspect the disclosure relates to a control unit arranged to control a marine vessel comprising two or more propulsion units. The control unit comprises processing circuitry which is configured to receive an input indicating a requested vessel function. In particular, the processing circuitry is configured to:

register an operating command indicating a requested bollard push function;
detect a current vessel position;
register the current vessel position as a desired vessel position;
execute the requested bollard push function;
monitor the current vessel position in order to detect a deviation relative to the desired vessel position;

and if a detected deviation relative to the desired vessel position has exceeded a predetermined value, the processing circuitry is configured to:

deactivate the requested bollard push function.

Optionally, the processing circuitry is further configured to:

register an updated current vessel position; and
execute a station keeping function in order to maintain the updated current vessel position.

According to a third aspect, the disclosure relates to a marine vessel, wherein the marine vessel comprises a control unit as described above.

According to a further aspect, the disclosure relates to a computer program comprising program code means for performing the above-mentioned method when said program is run on a computer. The disclosure also relates to a computer program product comprising program code means stored on a computer readable medium for performing the above-mentioned method when said program product is run on a computer.

An advantage of the disclosure is that it provides an automated means for performing a bollard push manoeuvre, as well as a means of detecting an unexpected drift of a vessel during this manoeuvre. A further advantage is that automated means for holding the vessel position if a bollard push function is deactivated. In this way the vessel operator no longer needs to perform the manoeuvre manually or to perform sudden manual corrections if drifting is detected. Complex manual action involving simultaneous throttle and helm control to prevent vessel displacement or drifting away from the dock can thereby be avoided.

BRIEF DESCRIPTION OF THE DRAWINGS

In the following text, the invention will be described in detail with reference to the attached drawings. These schematic drawings are used for illustration only and do not in any way limit the scope of the invention. In the drawings.

DETAILED DESCRIPTION OF EXAMPLE EMBODIMENTS OF THE INVENTION

Figure 1:
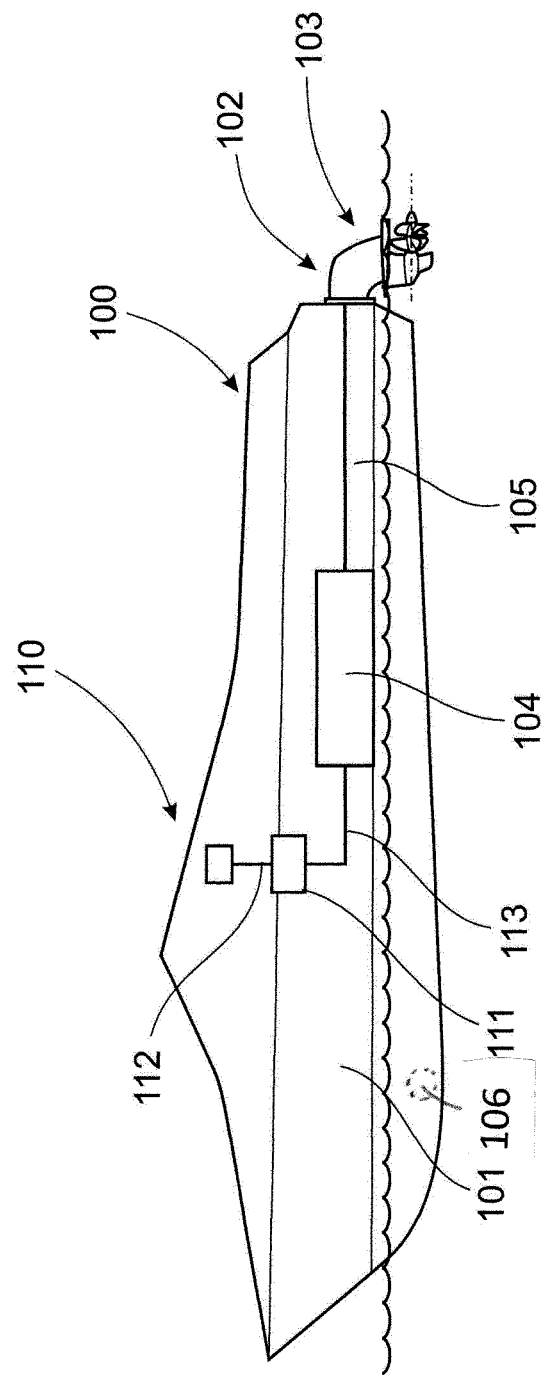
FIG. 1 shows a schematically indicated vessel

FIG. 1 shows a side view of a schematically illustrated marine vessel 100 comprising a hull 101 and a pair of drive units 102, 103 mounted to a transom on the vessel 100. The drive units 102, 103 are each powered by a driveline comprising a corresponding engine 104 and a transmission 105 (one shown). The example in FIG. 1 shows two drive units driven by inboard engines. A non-exclusive list of alternative arrangements includes, for instance, two or more outboard engines, a single propulsion unit combined with a bow thruster 106 (indicated in dashed lines), or two or more azimuthing pods arranged under the hull of the vessel. The engines can of course be replaced by electric motors using battery packs or fuel cells, or engines operated on alternative fuels. According to the disclosure, at least two drive units are required for manoeuvring the vessel.

The marine propulsion units 102, 103 are controllable by a control means such as a joystick 110 located at an operating position. The joystick 110 is connected to an electronic control unit (ECU) 111 via suitable wiring 112, which ECU 111 is connected to the driveline 104, 105 via additional wiring 113. Alternative control means includes a graphical user interface (GUI), such as a touch sensitive display, or manual controls comprising throttle levers and a steering wheel.

Figure 2:
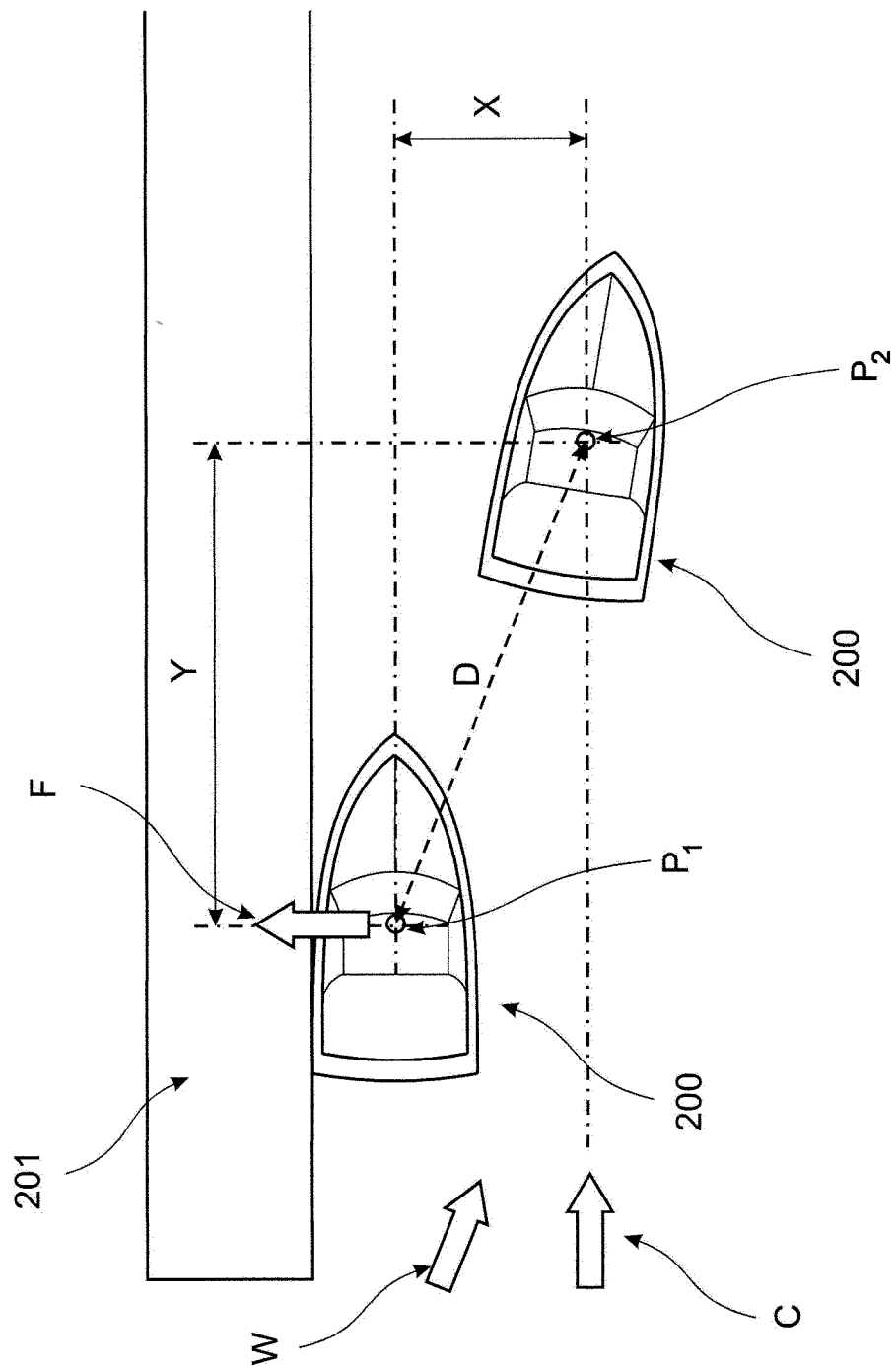
FIG. 2 shows the marine vessel maneuvered according to a first control strategy.

FIG. 2 shows the marine vessel being maneuvered according to a first control strategy. In this first example a vessel 200 is placed alongside a dock 201, with the side of the vessel arranged parallel to the side of the dock. The operator will then operate the vessel propulsion system, which comprises two or more drive units, requesting a transverse thrust sufficient to hold the vessel 200 against the dock 201, where after the operator issues an operating command to a control unit (see FIG. 1) indicating that a sideways bollard push function is requested. The operating command is registered in response to an input signal from a joystick, a graphical user interface (GUI) or to input signals from at least one throttle controller and a helm controller, optionally in combination with a switch. When the sideways bollard push function is activated, the drive units will maintain the requested transverse thrust in the direction of the arrow F to maintain the side of the vessel in contact with the dock in a desired vessel position $P_1$.

The control unit will then continuously monitor if a deviation has occurred between the current vessel position $P_2$ and the desired vessel position $P_1$. During the manoeuvre, a displacement in the transverse and/or the longitudinal direction of the vessel is constantly monitored. If the ambient conditions are unfavourable, the vessel can be suddenly displaced away from or along the dock, by a gust of wind, indicated by an arrow W, and/or a sudden water current, indicated by an arrow C. If a deviation of the current vessel position $P_2$ relative to the desired vessel position $P_1$ has exceeded a predetermined distance, then the requested sideways bollard push function is deactivated. The predetermined distance can be measured as a transverse distance X at right angles to the dock, a longitudinal distance Y parallel to the dock, or as a distance D between the desired vessel position $P_1$ and the current vessel position $P_2$. When the selected distance has exceeded the predetermined distance, the sideways bollard push function is deactivated and the thrust from the drive units is inhibited. Suitable values for the predetermined distances X, Y, D described above can be one or more pre-set values selected by the manufacturer or can be selected by the operator. The distance can be selected up to, for instance, 1 m.

The thrust from the drive units is inhibited in order to avoid further unexpected displacement of the vessel caused by the requested thrust and to give the operator time to resume control over the vessel. Optionally, the control unit can automatically activate a position hold function in response to a deactivation of the sideways bollard push function. In this way, the vessel can be prevented from drifting further away from the vessel position $P_2$ where the deactivation of the sideways bollard push function occurred. This will provide additional time to resume control over the vessel, should the operator not be in the immediate vicinity of the controllers at the operating position (see FIG. 1).

Figure 3:
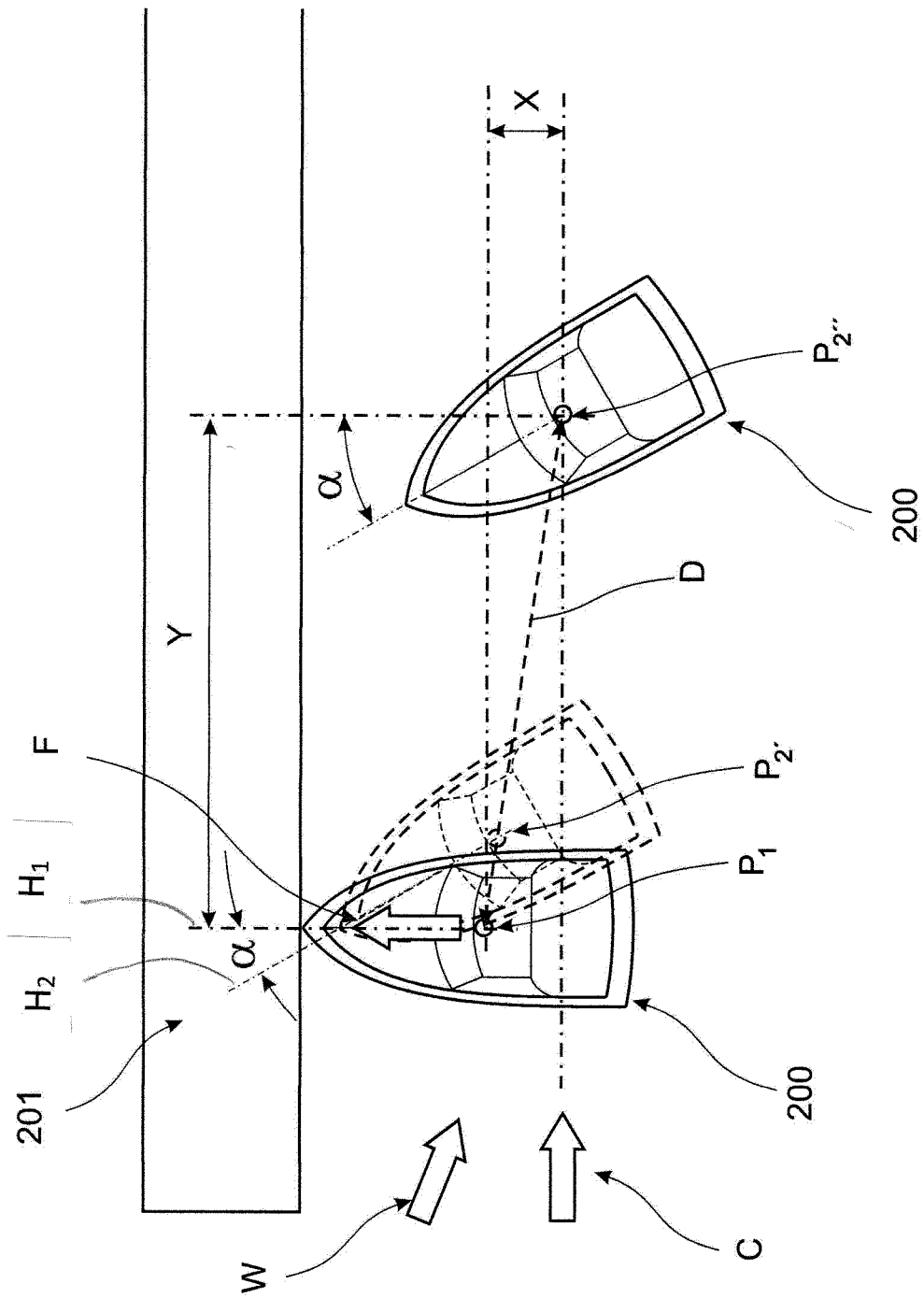
FIG. 3 shows the marine vessel maneuvered according to a second control strategy.

FIG. 3 shows the marine vessel being maneuvered according to a second control strategy. In this second example a vessel 200 is placed at an angle relative to a dock 201, with the bow of the vessel arranged against the dock. Here, the longitudinal direction, or heading of the vessel is arranged at right angles to the side of the dock. The operator then operates the vessel propulsion system, which comprises two or more drive units, requesting a forward thrust sufficient to hold the vessel 200 against the dock 201, where after the operator issues an operating command to a control unit (see FIG. 1) indicating that a bow bollard push function is requested. The operating command is registered in response to an input signal from a joystick, a graphical user interface (GUI) or to input signals from at least one throttle controller and a helm controller, optionally in combination with a switch. When the bow bollard push function is actuated, the drive units will maintain the requested forward thrust in the direction of the arrow F to maintain the bow of the vessel in contact with the dock in a desired vessel position $P_1$.

The control unit will then continuously monitor if a deviation has occurred between a current heading $H_2$ at a current vessel positions $P_2'$ and the desired heading $H_1$ at the desired vessel position $P_1$. During the manoeuvre, at least an angular displacement of the vessel, where the bow is at least initially a pivot point, is constantly monitored. If the ambient conditions are unfavourable, the vessel can be suddenly displaced away from or along the dock, by a gust of wind, indicated by an arrow W, and/or a sudden water current, indicated by an arrow C. If the current vessel heading $H_2$ is suddenly displaced a predetermined angle $\alpha$ away from the initial desired vessel heading $H_1$ relative to the dock, then the requested bow bollard push function is deactivated. The predetermined angle $\alpha$ is measured as an angular displacement representing a change in the vessel heading to either side of the desired vessel heading $H_1$. In FIG. 3, this would entail that the vessel would remain with the bow in the initial, desired position while the current heading $H_2$ changes relative to the desired heading $H_1$.

Optionally, a displacement in the transverse and/or the longitudinal direction of the vessel is simultaneously monitored (see FIG. 2). If a deviation of the current vessel position $P_2'$ $P_2''$ relative to the desired vessel position $P_1$ has exceeded a predetermined distance before the angle is exceeded, then the requested bow bollard push function is deactivated. The predetermined distance can be measured as a transverse distance X at right angles to the dock, a longitudinal distance Y parallel to the dock, or as a distance D between the desired vessel position $P_1$ and the current vessel position $P_2''$. By monitoring both parameters, any undesired displacement whether angular or linear can be detected. When either one of the predetermined angle $\alpha$ or the predetermined distance X, Y, D has exceeded its predetermined value, the bollard push function is deactivated and the requested thrust from the drive units is inhibited. FIG. 3 shows the latter example, where simultaneous angular and linear displacement has occurred to move the vessel to a new heading $H_2''$ and a new position $P_2''$. Suitable values for the predetermined angle $\alpha$ can be one or more pre-set values selected by the manufacturer or can be selected by the operator. The angle can be set at angles up to 20°.

The thrust from the drive units is inhibited in order to avoid further unexpected displacement of the vessel caused by the requested thrust and to give the operator time to resume control over the vessel. Optionally, the control unit can automatically activate a position hold function in response to a deactivation of the bow bollard push function. In this way, the vessel can be prevented from drifting further away from the vessel position $P_2'$, $P_2''$ where the deactivation of the bow bollard push function occurred. This will provide additional time to resume control over the vessel, should the operator not be in the immediate vicinity of the controllers at the operating position (see FIG. 1).

According to a further example, the method involves monitoring if the rate of change of the deviation for a current vessel position relative to the desired vessel position has exceeded a predetermined value. For instance, if the vessel in FIG. 2 or 3 is placed with its side or bow, respectively, against a dock when the bollard push manoeuvre is being performed, then the drive units will provide a suitable thrust to maintain the side or the bow of the vessel in contact with the dock. During the manoeuvre, any angular or linear displacement of the vessel is constantly monitored. If the vessel is displaced linearly or angularly away from the initial vessel position against the dock at a rate that exceeds a predetermined rate of change, then the requested bollard push function is deactivated.

Figure 4:
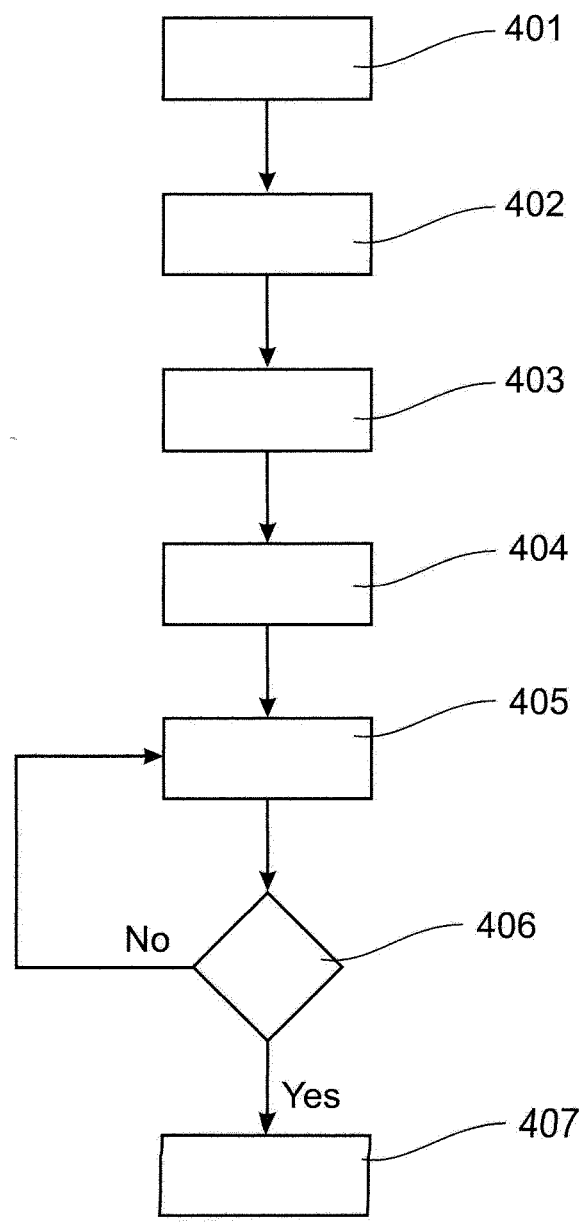
FIG. 4 shows a flow chart illustrating a first alternative method for controlling the vessel.

FIG. 4 shows a flow chart illustrating a first alternative method for controlling the vessel. The method involves performing a first step 401 where an operating command indicating a requested bollard push function is registered. In a second step 402 a current vessel position is detect using a suitable GNSS means, such as a Differential Global Positioning System (DGPS). In a third step 403 the current vessel position is registering as a desired vessel position in a control unit. In a fourth step 404 the control unit executes the requested bollard push function, using currently requested throttle and helm settings to hold the vessel in a desired position. In a fifth step 405 the control unit monitors the current vessel position in order to detect a deviation relative to the desired vessel position.

In a sixth step 406 the control unit compares a detected deviation parameter to a predetermined deviation value. The detected deviation can be that the vessel has been displaced a predetermined distance from the desired vessel position to the current vessel position. Alternatively, or in combination, the detected deviation can be that the vessel heading has been displaced a predetermined angle from the desired vessel heading to the current vessel heading. Further, the detected deviation can be that the rate of change of the linear or angular deviation for a current vessel position relative to the desired vessel position has exceeded a predetermined value. If a deviation is not detected, then the process returns to the fifth step 405, where the control unit continues to monitor any deviation from the current vessel position. If a detected deviation relative to the desired vessel position has exceeded a predetermined value, then the process proceeds to a seventh step 407, where the requested bollard push function is deactivated. In this example, deactivation of the bollard push function will also involve an inhibition of the thrust from the drive units. The operator will then take over and control the vessel manually.

Figure 5:
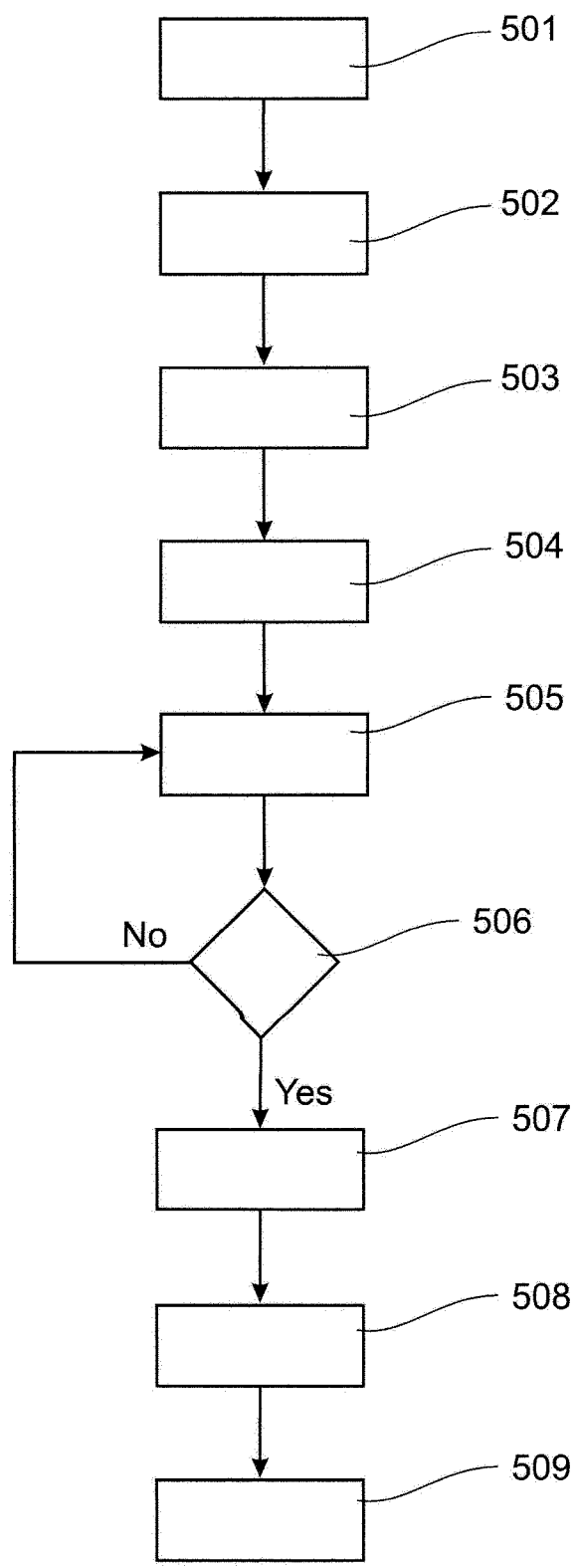
FIG. 5 shows a flow chart illustrating a second alternative method for controlling the vessel.

FIG. 5 shows a flow chart illustrating a second alternative method for controlling the vessel. In the same way as described for the first alternative method, the second alternative method involves performing a first step 501 where an operating command indicating a requested bollard push function is registered. In a second step 502 a current vessel position is detect using a suitable GNSS means, such as a Differential Global Positioning System (DGPS). In a third step 503 the current vessel position is registered as a desired vessel position in a control unit. In a fourth step 504 the control unit executes the requested bollard push function, using currently requested throttle and helm settings to hold the vessel in a desired position. In a fifth step 505 the control unit monitors the current vessel position in order to detect a deviation relative to the desired vessel position.

In a sixth step 506 the control unit compares a detected deviation parameter to a predetermined deviation value. The detected deviation can be that the vessel has been displaced a predetermined distance from the desired vessel position to the current vessel position. Alternatively, or in combination, the detected deviation can be that the vessel heading has been displaced a predetermined angle from the desired vessel heading to the current vessel heading. Further, the detected deviation can be that the rate of change of the linear or angular deviation for a current vessel position relative to the desired vessel position has exceeded a predetermined value. If a deviation is not detected, then the process returns to the fifth step 505, where the control unit continues to monitor any deviation from the current vessel position. If a detected deviation relative to the desired vessel position has exceeded a predetermined value, then the process proceeds to a seventh step 507, where the requested bollard push function is deactivated. Deactivation of the bollard push function also involves a temporary inhibition of the thrust from the drive units.

Following the deactivation of the bollard push function the process proceeds to an eight step 508 where an updated current vessel position is registered in the control unit, Subsequently, the control unit will execute a position hold function in a ninth step 509. The position hold function is performed in order to maintain the vessel in the updated current vessel position. The updated current vessel position can be the position of the vessel at the time when the requested bollard push function is deactivated and/or the thrust from the drive units is inhibited. This operation will prevent the vessel from drifting further away from the dock or towards the dock under the influence of external factors, such as wind or water currents. The vessel position is preferably determined by a Global Navigation Satellite System (GNSS) with a suitable accuracy, such as a Differential Global Positioning System (DGPS). The operator can then take over and control the vessel manually when desired.

The methods described in connection with FIGS. 4 and 5 are applicable to both sideways and bow bollard push manoeuvres.

Figure 6:
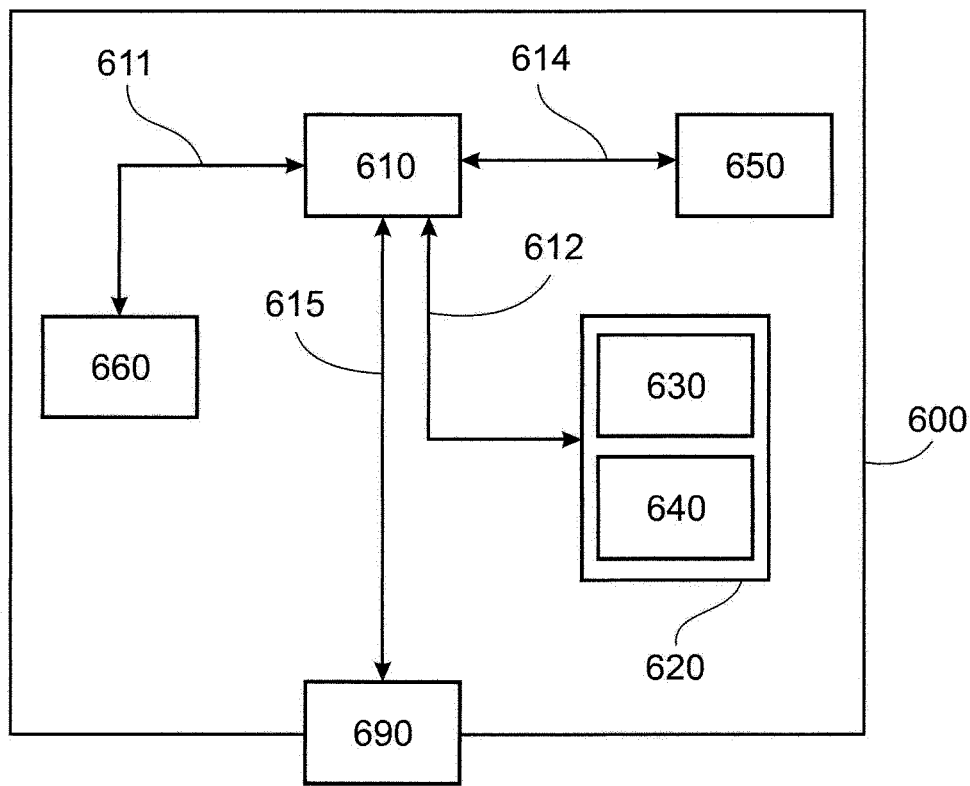
FIG. 6 shows the method applied on a computer arrangement.

According to a second aspect the disclosure relates to a control unit 111, 600 arranged to control a marine vessel comprising two or more propulsion units. The control unit is indicated in FIGS. 1 & 6 and comprises processing circuitry which is configured to receive an input indicating a requested vessel function. In particular, the processing circuitry is configured to:
  register an operating command indicating a requested bollard push function;
  detect a current vessel position;
  register the current vessel position as a desired vessel position;
  execute the requested bollard push function;
  monitor the current vessel position in order to detect a deviation relative to the desired vessel position;
and if a detected deviation relative to the desired vessel position has exceeded a predetermined value, the processing circuitry is configured to:
  deactivate the requested bollard push function.

Optionally, the processing circuitry is further configured to:
  register an updated current vessel position; and
  execute a station keeping function in order to maintain the vessel in the updated current vessel position.

The present disclosure also relates to a computer program, and a computer program product to be used with a computer for executing the method as described in any one of the above examples. FIG. 6 shows the method described in connection with FIG. 4 or 5 applied on a computer arrangement.

FIG. 6 shows an apparatus 600 according to the present disclosure, comprising a non-volatile memory 620, a processor 610 and a read-write memory 660. The memory 620 has a first memory part 630, in which a computer program for controlling the apparatus 600 is stored. The computer program in the memory part 630 for controlling the apparatus 600 can be an operating system. The apparatus 600 can be enclosed in, for example, a control unit, such as the control unit 111 in FIG. 1. The data-processing unit 610 can comprise, for example, a microcomputer. The memory 620 also has a second memory part 640, in which a program for controlling the docking manoeuvre according to the invention is stored. In an alternative embodiment, the program for controlling the docking manoeuvre is stored in a separate non-volatile storage medium 650 for data, such as, for example, a CD or an exchangeable semiconductor memory. The program can be stored in an executable form or in a compressed state.

When it is stated below that the data-processing unit 610 runs a specific function, it should be clear that the data-processing unit 610 is running a specific part of the program stored in the memory 640 or a specific part of the program stored in the non-volatile storage medium 650. The data-processing unit 610 is tailored for communication with the storage memory 650 through a data bus 614. The data-processing unit 610 is also tailored for communication with the memory 620 through a data bus 612. In addition, the data-processing unit 610 is tailored for communication with the memory 660 through a data bus 611. The data-processing unit 610 is also tailored for communication with a data port 690 by the use of a data bus 615.

The method according to the present disclosure can be executed by the data-processing unit 610, by the data-processing unit 610 running the program stored in the memory 640 or the program stored in the non-volatile storage medium 650.

The present disclosure should not be deemed to be limited to the embodiments described above, but rather a number of further variants and modifications are conceivable within the scope of the following patent claims.

The invention claimed is:

1. A method to control a marine vessel comprising two or more drive units; the method involving the steps of:
   registering an operating command indicating a requested bollard push function;
   detecting a current vessel position;
   registering the current vessel position as a desired vessel position;
   executing the requested bollard push function by controlling thrust and direction of the drive units in order to push the vessel against a fixed structure at a requested heading with a predetermined force;
   during execution of the requested bollard push function, monitoring the current vessel position in order to detect a deviation relative to the desired vessel position;
   if the detected deviation relative to the desired vessel position has exceeded a predetermined value,
   deactivating the requested bollard push function, wherein deactivation of the bollard push function will at least involve an inhibition of the thrust from the drive units.

2. The method according to claim 1, comprising monitoring if the deviation of a current vessel position relative to the desired vessel position has exceeded a predetermined distance.

3. The method according to claim 1, comprising monitoring if the deviation of a current vessel heading relative to the desired vessel heading has exceeded a predetermined angle.

4. The method according to claim 1, comprising monitoring if the rate of change of the deviation for a current vessel position relative to the desired vessel position has exceeded a predetermined value.

5. The method according to claim 1, comprising registering the bollard push function in response to an input signal from a joystick.

6. The method according to claim 1, comprising registering the bollard push function in response to an input signal from a graphical user interface.

7. The method according to claim 1, comprising registering the bollard push function in response to input signals from at least one throttle controller and a helm controller.

8. The method according to claim 1, comprising disengaging the drive units when deactivating the requested bollard push function.

9. The method according to claim 1, comprising the further steps of:
   registering an updated current vessel position; and
   executing a position hold function in order to maintain the updated current vessel position.

10. The method according to claim 1, wherein the vessel position is determined by a Global Navigation Satellite System.

11. A non-transitory computer program product comprising program code stored on a computer readable medium for performing the method according to claim 1 when said program code is run on a computer.

12. A control unit arranged to control a marine vessel comprising two or more propulsion units, the control unit comprising processing circuitry, the processing circuitry being configured to receive an input indicating a requested vessel function, wherein the processing circuitry is configured to:
   register an operating command indicating a requested bollard push function;
   detect a current vessel position;
   register the current vessel position as a desired vessel position;
   execute the requested bollard push function by controlling thrust and direction of the drive units in order to push the vessel against a fixed structure at a requested heading with a predetermined force;
   during execution of the requested bollard push function, monitor the current vessel position in order to detect a deviation relative to the desired vessel position;
   if the detected deviation relative to the desired vessel position has exceeded a predetermined value, the processing circuitry is configured to:
   deactivate the requested bollard push function, wherein deactivation of the bollard push function will at least involve an inhibition of the thrust from the drive units;
   register an updated current vessel position; and
   execute a station keeping function in order to maintain the updated current vessel position.

13. Marine vessel, wherein the marine vessel comprises a control unit according to claim 12.

* * * * *